United States Patent [19]

Chattha

[11] Patent Number: 4,465,815

[45] Date of Patent: Aug. 14, 1984

[54] POLYHYDROXY OLIGOMERS FOR HIGH SOLIDS COATINGS II

[75] Inventor: Mohinder S. Chattha, Livonia, Mich.

[73] Assignee: Ford Motor Company, Dearborn, Mich.

[21] Appl. No.: 334,801

[22] Filed: Dec. 28, 1981

[51] Int. Cl.$^3$ .................. C08L 67/02; C08L 61/28
[52] U.S. Cl. .................. 525/443; 428/458; 428/460; 524/539; 525/519; 528/307; 549/512; 549/515; 549/516
[58] Field of Search .......... 525/443, 519; 524/539; 528/307; 549/512, 515, 516

[56] References Cited

U.S. PATENT DOCUMENTS

| | | | |
|---|---|---|---|
| 2,460,186 | 1/1949 | Moffett | 524/285 |
| 3,397,255 | 8/1968 | Coats | 525/519 |
| 3,544,656 | 12/1970 | Hornung et al. | 525/443 |
| 3,553,284 | 1/1971 | Reimhofer | 525/519 |
| 3,600,459 | 8/1971 | Vasta | 525/443 |
| 3,668,275 | 6/1972 | Reimhofer et al. | 525/443 |
| 3,668,276 | 6/1972 | Reimhofer | 525/519 |
| 3,678,128 | 7/1972 | Reimhofer et al. | 525/443 |
| 3,691,258 | 9/1972 | Reimhofer | 525/519 |
| 3,959,201 | 5/1976 | Chang | 525/443 |
| 4,297,448 | 10/1981 | Chang et al. | 427/409 |
| 4,314,918 | 2/1982 | Binkmeyer | 525/519 |
| 4,332,711 | 6/1982 | Kooymans et al. | 523/501 |

*Primary Examiner*—Theodore E. Pertilla
*Attorney, Agent, or Firm*—Lorraine S. Melotik; Roger L. May

[57] ABSTRACT

A novel polyhydroxy oligomer crosslinkable with amine-aldehyde to form a coating composition adapted for use as an automotive topcoat which upon curing forms a hard, glossy, durable coating with outstanding weatherability and excellent resistance to solvents and water. The coating composition comprises:

(A) a polyhydroxy oligomer having a number average ($M_n$) molecular weight of between about 300–2000 and being the reaction product of:
  (i) an acid ester made by reacting
    (a) a $C_3$–$C_{10}$ aliphatic branched diol, and
    (b) an alkyl hexahydrophthalic anhydride, wherein (a) and (b) are combined in the reaction mixture in amounts and under conditions sufficient to result in reaction in a molar ratio of greater than 1:1 up to 1:2; and
  (ii) a monoepoxide $C_2$–$C_{10}$ monomer, the monomer is included in an amount sufficient to provide reaction of about 1.0 epoxide groups for each acid group of the acid ester;
(B) an amine-aldehyde crosslinking agent; and
(C) optionally a hydroxy functional additive.

The amine-aldehyde crosslinking agent is included in the composition in an amount sufficient to provide at least about 0.60 equivalents of nitrogen crosslinking functionality for each equivalent of hydroxyl functionality included in the composition either on the polyhydroxy oligomer or as a hydroxyl group of the hydroxy functional additive.

44 Claims, No Drawings

POLYHYDROXY OLIGOMERS FOR HIGH SOLIDS COATINGS II

Reference is made to commonly assigned and concurrently filed U.S. Application Ser. Nos. 334,800 entitled "New Polyhydroxy Oligomers for High Solids Coatings I", and 334,686 entitled "High Solids Coatings from New Tetrahydroxy Oligomers", 334,802 entitled "New High Solids Urethane Coatings I, 334,799 entitled "New High Solids Urethane Coatings II, and entitled "High Solids Urethane Coatings From New Tetrahydroxy Oligomers, all to Chattha.

This invention relates to novel coating compositions. More particularly, the invention relates to high solids thermosetting coating compositions which are adapted to provide an automotive topcoat demonstrating hardness, high gloss, outstanding durability and excellent resistance to solvents and water, and which comprise novel polyhydroxy, preferably dihydroxy, oligomers crosslinkable with aminoplast resins. Most particularly, this invention relates to low viscosity, high solids compositions having superior weathering properties wherein the novel polyhydroxy oligomers are made by first reacting a low molecular weight branched diol with an alkyl hexahydrophthalic anhydride to form an acid ester, wherein at least some, more preferably all of the acid ester is a dicarboxylic acid ester. This acid ester is further reacted with a monoepoxide $C_2$–$C_{10}$ monomer to esterify the acid functionalities of the ester and generate the polyhydroxy oligomer.

BACKGROUND OF THE INVENTION

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance.

The coating compositions of this invention combine the above discussed desired properties and low application viscosity so as to overcome deficiencies of previously proposed high solids materials. In particular, these high solids coating compositions exhibit weathering properties superior to other single component high solids paints making them ideally suitable for automotive topcoats, clear or pigmented, including metallic flake.

BRIEF DESCRIPTION OF THE INVENTION

The low viscosity thermosetting coating composition of this invention preferably contains greater than about 60% by weight, more preferably greater than 70% by weight, of nonvolatile solids, and exhibits superior weathering to other high solids single component paints. The composition comprises:

(A) A polyhydroxy oligomer having a number average ($\overline{M}_n$) molecular weight of between about 300–2000 and being the reaction product of:
  (i) an acid ester made by reacting:
    (a) a $C_3$–$C_{10}$ aliphatic branched diol, and
    (b) an alkyl hexahydrophthalic anhydride, wherein (a) and (b) combined in the reaction mixture in amounts sufficient to result in reaction in a molar ratio of greater than 1:1 up to 1:2; and
  (ii) a monoepoxide $C_2$–$C_{10}$ monomer, wherein the monomer is included in amount sufficient to provide reaction of about 1.0 epoxide group for each acid group of the acid ester;

(B) an amine-aldehyde crosslinking agent; and (C) 0–50 weight percent based on the total weight of (A), (B) and (C) of a hydroxy functional additive having a number average molecular weight ($M_n$) of between about 150–6000, preferably between about 500–2500.

The amine-aldehyde crosslinking agent is included in the composition in an amount sufficient to provide at least about 0.60, preferably between about 0.75 to 3.75, equivalents of nitrogen crosslinking functionality for each equivalent of hydroxyl functionality included in the composition either on the polyhydroxy oligomer or as a hydroxyl group of the hydroxyl functional additive. The oligomers of this composition are compatible, in particular, with low molecular weight hydroxy functional acrylics. In addition, the coating composition of this invention may include conventional additives such as catalysts, antioxidants, U.V. absorbers, flow control or wetting agents, antistatic agents, pigments, plasticizers, solvents, etc. The oligomers of this composition are also compatible with nonaqueous dispersions (NAD's), which are generally used as flow control additives.

The invention is also directed to the oligomer of the coating composition described above.

The preferred oligomer is a dihydroxy oligomer which is the reaction product of a monoepoxide $C_2$–$C_{10}$ monomer having no hydroxyl functionality.

DETAILED DESCRIPTION OF THE INVENTION

The high solids coating composition of this invention provide a system which is particularly suitable for those applications requiring a coating having high gloss, hardness, durability and high solvent and water resistance as well as low temperature cure. The desirable characteristics of the coating composition of this invention, in particular, the excellent physical properties and weatherability, are believed to result from the steric hinderance to hydrolysis afforded the ester groups of the oligomer by the alkyl group of the anhydride. However, while this theory has been advanced to explain the excellent durability of this coating composition, neither its validity nor its understanding is necessary for the practice of the invention.

Each of the components of the coating composition, the amounts of each of the components required to achieve the desired results of the invention and a method for applying the composition are described hereinafter in greater detail.

POLYHYDROXY OLIGOMERS

A principal material in the coating of this invention is a polyhydroxy oligomer having a number average ($\overline{M}_n$) molecular weight between about 300 and about 2000, more preferably between about 700 and about 1500. The oligomer is prepared by first combining a low molecular weight $C_3$–$C_{10}$ aliphatic branched diol with an alkyl hexahydrophthatic anhydride in the reaction mixture in amounts sufficient to result in reaction in a molar ratio of greater than 1:1 up to 1:2 to form an acid ester, i.e., some, preferably all, of this ester will be a dicarboxylic acid ester. A slight excess of anhydride may be used over that actually required for the reaction with the diol. This ester is subsequently reacted with a monoepoxide $C_2$–$C_{10}$ monomer, the monomer being included in an amount sufficient to provide reaction of about 1.0 epoxide groups of the monomer for each acid (carboxyl) group of the ester, i.e, sufficient to react (esterify) all of the acid groups. If more monomer is used than necessary for this reaction, the excess may thereafter be removed, as would be apparent to one skilled in the art.

The aliphatic branched diol of this invention preferably contains only one primary hydroxyl group, the second hydroxyl of the diol is therefore preferably a secondary or tertiary hydroxyl, preferably a secondary hydroxyl. Additionally it is preferable that the hydroxyl groups not be on adjacent carbons and more preferably be separated by at least three carbon atoms. The carbon chain may also be interrupted or substituted by non-interfering functionality. Suitable $C_3$–$C_{10}$ aliphatic branched diols include but are not limited to, 2-ethyl-1,3 hexane diol, 1,3-butane diol, 1,2-butane diol and 1,2-propane diol, with 2-ethyl-1,3-hexane diol being most preferred. The choice of other suitable diols would be within the skill of one in the art. Mixtures of these diols can also be used.

The alkyl hexahydrophthalic anhydride preferably contains a lower alkyl group, i.e., an alkyl group having up to about seven carbons, preferably up to four carbons. Additionally, the alkyl group may be substituted or interrupted by non-interfering functionality. Suitable anhydrides useful in this invention include methyl hexahydrophthalic anhydride and the ethyl and propyl analogs, with methyl hexahydrophthalic anhydride being most preferred.

Suitable monoepoxide $C_2$–$C_{10}$ monomers useful in this invention include, but are not limited to, monoepoxides whose carbon chain may be interrupted by oxygen or be hydroxy substituted and glycidyl esters and glycidyl ethers. Examples of such monomers which may be used include alkylene oxides such as propylene oxide, ethylene oxide and 1,2-epoxy decane, styrene oxide, cyclohexane oxide, n-butyl glycidyl ether, glycidol acetate and glycidol. Since the preferred oligomer contains two hydroxyl groups, the preferred $C_2$–$C_{10}$ monomer will be mono-functional (i.e., the only reactive functioality will be the epoxide). The preferred monomer therefore has no hydroxyl functionality and is selected from mono-functional monoepoxides and glycidyl esters and glycidyl ethers having no hydroxyl functionality.

As would be apparent to one skilled in the art, suitable mixtures of these monomers could also be used.

In preparing the polyhydroxy oligomers, the branched diol (a) and the anhydride (b) are combined and reacted at an elevated temperature for a time necessary to form the acid ester. This reaction product preferably consists of esters having two acid functionalities as would be the case wherein the diol and the anhydride are reacted in the 1:2 molar ratio. However, the reaction product can also consist of a mixture of diacid and monoacid esters as would result when the diol and anhydride are reacted in a ratio greater than 1:1 but less than 1:2. Subsequently, the epoxide containing monomer is added dropwise to the reaction mixture, generally in the presence of a catalyst, and the mixture is maintained at elevated temperatures for a time necessary to complete the esterification of the acid groups of the ester by the monomer. During this reaction step, the carboxyl group of the ester opens the epoxide ring of the monomer generating a hydroxyl group.

Preferred esterification catalysts for the carboxy/epoxy reaction useful in preparation of hydroxy functional oligomers are the tetraalkyl ammonium salts such as tetra methyl ammonium chloride, tetraethyl ammonium bromide and trimethyl benzyl ammonium chloride as well as metal salts of a carboxylic acid, such as potassium octoate or chromium III octoate. Other useful esterification catalysts include: metal halides such as chromium trichloride, ferric trichloride, and aluminum trichloride; mercaptans and thioethers such as octyl mercaptan, dimercapto propanol and dimercaptodiethyl ether; tertiary amines such as triethyl amine, pyridine, dimethylaniline, quinoline, B-picoline, ethylpyridine; and the like. Still other catalysts known to catalyze carboxy/epoxy reactions will be apparent to those skilled in this art.

Various mixtures of these types of oligomers may also be employed within the scope of the compositions of the invention described herein.

Although the above reactions may be carried out with or without solvents, it is generally suitable and preferable, in order to achieve the preferred high solids level of the coating composition to use little or no solvent. However, when desirable, suitable solvents which may be employed include those commonly used, such as toluene, xylene, methyl amyl ketone, etc.

AMINO CROSSLINKING AGENT

A second essential component of the paint compositions of this invention is an amine-aldehyde crosslinking agent. Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention are amine-aldehyde resins such as condensation products of formaldehyde with melamine, substituted melamine, urea, benzoguanamine or substituted benzoguanamine. Preferred members of this class are methylated melamine-formaladehyde resins such as hexamethoxymethylmelamine. These liquid crosslinking agents have substantially 100 percent nonvolatile content as measured by the foil method at 45° C. for 45 minutes. For the preferred high solids compositions of the invention it should be recognized that it is important not to introduce extraneous diluents that would lower the final solids content of the coating. Other suitable amine-aldehyde crosslinking agents are well known and would be apparent to one skilled in the art.

Particularly preferred crosslinking agents are the amino crosslinking agents sold by American Cyanamid under the trademark "Cymel." In particular, Cymel 301, Cymel 303, Cymel 325 and Cymel 1156, which are alkylated melamine-formaldehyde resins are useful in the compositions of this invention.

The crosslinking reactions are generally catalytically accelerated by acids. One such catalyst, for example, which may be so employed is p-toluene sulfonic acid, generally added to the composition in about 0.5% by weight based on the total weight of ester and crosslinking agent.

The amine-aldehyde materials function as a crosslinking agent in the composition of the invention by reacting with the hydroxy functionality of the oligomer and by reaction with hydroxy functionality on the hydroxy functional additive if such material is included in the composition.

In order to achieve the outstanding properties which make these coating compositions particularly useful as automotive topcoat materials, it is essential that the amount of amino crosslinking agent be sufficient to substantially completely crosslink the hydroxyl functionality in the coating composition. Therefore, the amino crosslinking agent should be included in the composition in an amount sufficient to provide at least about 0.60 equivalents, preferably between about 0.75 and about 3.75 equivalents, of nitrogen crosslinking functionality for each equivalent of hydroxyl functionality included in the composition either as a hydroxyl group on the optional hydroxy functional additive or on the polyhydroxy oligomer.

OPTIONAL HYDROXY FUNCTIONAL ADDITIVE

Additional hydroxy functionality other than that present on the polyhydroxy oligomer may be achieved by adding a hydroxy functional additive in amounts up to about 50 weight percent based on the total of the two above discussed components and the hydroxy functional additive itself. Such a material serves to provide additional hydroxy functional additives so as to provide a more intimate crosslinked structure in the final cured product. The hydroxy functional additives useful in the composition are preferably selected from various polyols having a number average molecular weight ($\overline{M}_n$) of between about 150 and about 6000, preferably between about 400 and about 2500. As used herein the term polyol means a compound having two or more hydroxyl groups.

The polyols useful in the invention preferably are selected from the group consisting of: (i) hydroxy functional polyesters; (ii) hydroxy functional polyethers; (iii) hydroxy functional oligoesters; (iv) monomeric polyols; (v) hydroxy functional copolymers produced by free radical polymerization of monoethylenically unsaturated monomers, one of which bears hydroxy functionality and which is included in the copolymer in an amount ranging from about 10 to about 50 weight percent, and (vi) mixtures of (i)–(v).

U.S. Pat. No. 4,181,784 to Chattha et al teaches a high solids paint composition comprising an optional hydroxy functional additive. This patent is hereby expressly incorporated by reference as detailing hydroxy functional additives representative of those which are suitable for use as such in the composition of this invention. The following presents a brief description of the optional hydroxy functional additives.

The hydroxy functional polyesters useful in the invention are preferably fully saturated products prepared from aliphatic dibasic acids containing 2–20 carbon atoms, and short chain glycols of up to and including 21 carbon atoms. The molecular weight of these materials ranges from about 200 to about 2500 and the hydroxyl number ranges from about 30 to about 230.

Among preferred polyesters are products derived from esterification of ethylene glycol and 1,4 butane diol with adipic acid, ethylene glycol and 1,2 propylene glycol with adipic acid, azelaic acid and sebacic acid copolyester diols and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

Oligoester (i) is prepared by reacting a dibasic carboxylic acid with a monoepoxide, preferably include those formed by reacting $C_6$–$C_{12}$ dicarboxylic aliphatic acids with ethylene oxide or propylene oxide.

The preparation of oligoesters from carboxylic acids and polyepoxides is well known and is described, for example, in U.S. Pat. Nos. 2,456,408 and 2,653,141. Numerous hydroxy functional oligoesters within this general category will be apparent to those skilled in the art. The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxy bearing copolymer useful as the hydroxy functional additive may be formed from monoethylenically usaturated monomers, with between about 10 and about 50 weight percent bearing hydroxyl functionality.

Although one of ordinary skill in the art will recognize that many different hydroxy bearing monomers could be employed, the preferred hydroxy functional monomers for use in the hydroxy functional resin of the invention are $C_5$–$C_7$ hydroxy alkyl acrylates and/or $C_6$–$C_8$ hydroxy alkyl methacrylates, i.e., esters of $C_2$–$C_4$ dihydric alcohols and acrylic or methacrylic acids.

The remainder of the monomers forming the hydroxy functional copolymer, i.e., between about 90 and about 50 weight percent of the monomers of the copolymer, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

OTHER MATERIALS

In addition to the above discussed components, other materials may be included in the coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methyamyl ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the polyhydroxy functional oligomer of the coating composition is prepared, may be employed as the solvent for the coating composition thus eliminating the need for drying the oligomer after preparation, if such is desired. As mentioned above, the nonvolatile solids content of the high solids coating composition is preferably at least 60%, and more preferably 70% or more, thus limiting the amount of solvent included in the composition. The subject paint composition may comprise 100% solids thereby including no solvent. However, while the polyhydroxy oligomers of the subject invention are particularly suitable for making high solids coatings, they are also suitable for use in compositions that are not high solids compositions. Determination of optimal solids content for a given application would be within the skill of one in the art.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings, particularly on metal surfaces. These surface modifiers are exemplified by acrylic polymers containing 0.1-10 percent by weight of a copolymerized monoethylenically unsaturated carboxylic acids such as methacrylic acid, acrylic acid or itaconic acid, cellulose acetate butyrate, silicone oils or mixtures thereof. Of course, the choice of surface modifiers or wetting agent is dependent upon the type of surface to be coated and selection of the same is clearly within the skill of the artisan.

The coating composition of the invention also may include pigments. The amount of pigment in the coating composition may vary, but preferably is between about 3 and about 45 weight percent based on the total weight of the paint composition. If the pigment is metallic flake, the amount ranges from about 1 to about 20 weight percent.

For many applications of the coating compositions of the invention, particularly high solids compositions, it may be desirable to employ flow control additives to provide sag free coatings. Among numerous such materials, NAD's such as described by Porter (S. Porter, Jr., and B. N. McBane, U.S. Pat. Nos. 4,025,474, May 24, 1977) are compatible with these oligomeric coating compositions. These particle dispersions may be included in an amount up to 15% by weight of the total composition. Other types of NAD's such as described by D. L. Maker and S. C. Peng (U.S. Pat. No. 3,814,721, June 4, 1974) also may be included in the paint composition.

APPLICATION TECHNIQUES

The coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying a high solids coating compositions, particularly when applying the same to automobiles as topcoats, is spray coating through the nozzle of a spray gun.

High solids paints have in the past caused some difficulty in spray coating techniques because of the high viscosity of the materials and resultant problems in clogging of spray guns. However, because the compositions of this invention can demonstrate relatively low viscosity, considering the preferred high solids content, they can be applied by spray coating techniques.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

Methylhexahydrophthalic anhydride (1685 g) and 2-ethyl-1,3-hexanediol (731 g) are placed in a 5 liter flask and the reaction mixture is heated slowly (2 hours) to 100° C. The reaction mixture is stirred at this temperature for five hours. The flask is fitted with a cold water condenser and a solution of Cordova Accelerator AMC ™ -2 (available from Cordova Chemical Company), (7 g) in propylene oxide (850 g) is added dropwise with continuous stirring and heating. After the addition is complete, the reaction mixture is heated 100° C. for five hours. Excess propylene oxide is then removed under reduced pressure.

Sixty-five (65) parts of the above oligomer, 43 part of Cymel 325 (American Cyanamid Co.) and 1 part of phenyl acid phosphate are dissolved in 37 parts of butyl acetate. The resulting formulation is applied by spraying to primed steel panels which are baked at 130° C. for 20 minutes to obtain coatings with excellent hardness, adhesion and gloss and solvent (xylene and methyl ethyl ketone) resistance.

EXAMPLE 2

Seven (7) parts of aluminum flakes (65% in naphtha) are mixed with the paint composition described in Example 1. The resulting formulation is applied by spraying to primed steel panels which are baked at 130° C. for 18 minutes to obtain silver metallic coatings with excellent hardness, adhesion and solvent (xylene and methyl ethyl ketone) resistance.

EXAMPLE 3

Methylhexahydrophthalic anhydride (1008 g) and 2-ethyl-1,3-hexanediol (437 g) are placed in a three liter flask and the reaction mixture is stirred at 100° C. for five hours. Four grams of Cordorva Accelerator AMC ™ -2 are dissolved in 782 grams of n-butylglycidyl ether and added dropwise with continuous stirring. After the addition is complete, the reaction mixture is stirred at 100° C. for five hours.

Seventy-two (72) parts of the above oligomer, 37 parts of Cymel 301 (American Cyanamid Co.) and 1.5 parts of butyl acid phosphate are dissolved in 41 parts of butyl acetate. The resulting formulation is applied by spraying to primed steel panels which are baked at 132° C. for 20 minutes to obtain coatings with excellent gloss, hardness, adhesion and solvent (xylene and methyl ethyl ketone) resistance.

EXAMPLE 4

One hundred and fifteen (115) parts of the oligomer from Example 3 are dissolved in 133 parts of methyl amyl ketone and 410 parts of titanium dioxide are added under agitation to this solution. The mixture is whipped with a Cowl's blade at 90 cycles per second for half an hour.

Forty-nine parts of the above millbase, 30 parts of the oligomer from Example 3, and 27 parts of Cymel 301 (American Cyanamid Co.) are mixed with 21 parts of butyl acetate. A 50% solution (0.5 parts) of p-toluene sulfonic acid in 2-propanol is added to the above mixture and the resulting formulation is applied by spraying to primed steel panels. The panels are baked at 128° C. for 20 minutes to obtain hard, glossy and solvent resistant (xylene and methyl ethyl ketone) coatings.

EXAMPLE 5

Eleven (11) parts of caprolactone based hydroxy ester PCP-0300 (Union Carbide), 6 parts of hexabutoxymethyl melamine (Cymel 1156, American Cyanamid) and 7 parts of methyl amyl ketone are added to the formulation described in Example 1. The resulting formulation is applied by spraying to primed steel panels which are baked at 135° C. for 17 minutes to obtain coatings with promising physical properties.

EXAMPLE 6

Ten (10) parts of hydroxy polymer Acryloid OL-42 (Rohm and Haas Chemical Co.) and seven parts of ethoxymethoxy benzoguanamine (Cymel 1123, American Cyanamid) and five parts of methyl amyl ketone are added to the formulation described in Example 1. The resulting formulation is applied by spraying to primed steel panels which are baked at 135° C. for 18 minutes to obtain coatings with excellent hardness, adhesion and solvent (xylene and methyl ethyl ketone) resistance.

EXAMPLE 7

A hydroxy acrylic polymer ($\overline{M}_n$=2200) is prepared by solution polymerization technique in methyl amyl ketone (60% solids by weight) comprising hydroxyethyl acrylate (30%), isobutyl methacrylate (45%) and styrene (25%).

Sixteen parts of this polymer solution, seven parts of Cymel 301 and five parts of butyl acetate are added to the paint composition described in Example 3. The resulting formulation is applied by spraying to primed steel panels which are baked at 130° C. for 20 minutes to obtain coatings with excellent gloss, hardness, adhesion and solvent (xylene and methyl ethyl ketone) resistance.

EXAMPLE 8

Methylhexahydrophthalic anhydride (330 g) 1,3-butanediol (90 g) and butylglycidyl ether (260 g) were reacted in the presence of Cordova Accelerator AMC ™ -2 (5 g) by following the procedure described in Example 3.

Fifty-five (55) parts of the above oligomer, 42 parts of Cymel 301 and 1.6 parts of 2-hydroxycyclohexyl p-toluene sulfonate are dissolved in 37 parts of butyl acetate. The resulting formulation is applied by spraying to primed steel panels which are baked at 140° C. for 20 minutes to obtain coatings with excellent hardness, adhesion, gloss and solvent (xylene and methyl ethyl ketone) resistance.

EXAMPLE 9

Nine (9) parts of nonaqueous dispersed particles (42% by weight), prepared as described in Example A of U.S. Pat. No. 4,025,474, are added to the composition described in Example 2. The resulting formulation is applied by spraying to primed steel panels which are then baked at 130° C. for 19 minutes to obtain silver metallic coatings with excellent hardness, adhesion and solvent (xylene and methyl ethyl ketone) resistance.

In view of this disclosure, many modifications of this invention will be apparent to those skilled in the art. It is intended that all such modifications which fall within the true scope of this invention be included within the terms of the appended claims.

I claim:

1. A thermosetting coating composition adapted for low temperature bake applications comprising:
    (A) a polyhydroxy oligomer having a number average ($\overline{M}_n$) molecular weight of between about 300–2000 and comprising the reaction product of:
        (i) an acid ester made by reacting:
            (a) a $C_4$–$C_{10}$ aliphatic branched diol, and
            (b) an alkyl hexahydrophthalic anhydride, wherein (a) and (b) are combined in the reaction mixture in amounts and under conditions sufficient to result in reaction in a molar ratio of greater than 1:1 up to 1:2; and
        (ii) a monoepoxide $C_2$–$C_{10}$ monomer, wherein said monomer is included in an amount sufficient to provide reaction of about 1.0 epoxide group for each acid group of said acid ester;
    (B) an amine-aldehyde crosslinking agent; and
    (C) 0–50 weight percent based on the total weight of (A), (B) and (C) of a hydroxy functional additive having a number average molecular weight ($\overline{M}_n$) of between about 150–6000,
    said amine-aldehyde crosslinking agent being included in said composition in an amount sufficient to provide at least about 0.60 equivalents of nitrogen crosslinking functionality for each equivalent of hydroxyl functionality included in said composition either on said polyhydroxy oligomer or as a hydroxyl group of said hydroxy functional additive.

2. A coating composition according to claim 1, wherein the hydroxy groups of said diol are not attached to adjacent carbon atoms.

3. A coating composition according to claim 2, wherein said diol is 2-ethyl-1,3-hexane diol.

4. A coating composition according to claim 1, wherein the alkyl group of said alkyl hexahydrophthalic anhydride comprises a lower alkyl group having up to about seven carbons.

5. A coating composition according to claim 3 or 4, wherein said anhydride is methyl hexahydrophthalic anhydride.

6. A coating composition according to claim 4, wherein said monoepoxide $C_2$–$C_{10}$ monomer is selected from the group consisting of alkylene monoepoxides, glycidyl esters, glycidyl ethers, and mixtures thereof.

7. A coating composition according to claims 1 or 6, wherein said polyhydroxy oligomer is a dihydroxy oligomer and said monoepoxide $C_2$–$C_{10}$ monomer contains no hydroxyl functionality.

8. A coating composition according to claim 7, wherein said alkyl hexahydropthalic is methyl hexahydrophthalic anhydride.

9. A coating composition according to claim 8, wherein said branched diol is 2-ethyl-1,3-hexane diol.

10. A coating composition according to claim 9, wherein said monoepoxide monomer is propylene oxide.

11. A coating composition according to claim 1, wherein said amine-aldehyde crosslinking agent is selected from the group consisting of condensation products of formaldehyde with melamine, substituted melamine, urea, benzoguanamine and substituted benzoguanamine, and mixtures of said condensation products in an amount sufficient to provide between about 0.75 and about 3.75 equivalents of nitrogen crosslinking functionalilty for each equivalent of hydroxy functionality included in said composition either on said polyhydroxy oligomer or as a hydroxyl group of said hydroxy functional additive.

12. A coating composition according to claim 1, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 50 weight percent of said copolymer, and (vi) mixtures of (i)-(v).

13. A coating composition according to claim 1, wherein said composition further comprises up to 15 weight percent, based on the total weight of said composition, of a flow control additive.

14. A coating composition according to claim 1, wherein said acid ester is a dicarboxylic acid ester made by combining said diol and said anhydride in the reaction mixture in amounts and under conditions sufficient to result in reaction in a 1:2 molar ratio.

15. A coating composition according to claim 14, wherein said anhydride is methyl hexadrophthalic anhydride.

16. A coating composition according to claim 15, wherein said diol is 2-ethyl-1,3-hexane diol.

17. A coating composition according to claim 14 or 16, wherein said monoepoxide $C_2$-$C_{10}$ monomer is selected from the group consisting of alkylene monoepoxides, glycidyl ethers, glycidyl esters, and mixtures thereof.

18. A coating composition according to claim 17, wherein said monoepoxide monomer contains no hydroxy functionality.

19. A polyhydroxy oligomer having a number average ($\overline{M}_n$) molecular weight between about 300-2000 and comprising the reaction product of:
(i) an acid ester made by reacting:
(a) a $C_4$-$C_{10}$ aliphatic branched diol, and
(b) an alkyl hexahydrophthalic anhydride, wherein (a) and (b) are combined in the reaction mixture in amounts and under conditions sufficient to result in reaction in a molar ratio greater than 1:1 up to 1:2;
(ii) a monoepoxide $C_2$-$C_{10}$ monomer, wherein said monomer is included in an amount sufficient to provide reaction of about 1.0 epoxide group for each acid group of said acid ester.

20. A polyhydroxy oligomer according to claim 19, wherein the hydroxy groups of said diol are not attached to adjacent carbon atoms.

21. A polyhydroxy oligomer according to claim 20, wherein said branched diol is 2-ethyl-1,3-hexane diol.

22. A polyhydroxy oligomer according to claim 19, wherein said alkyl hexahydrophthalic anhydride comprises a lower alkyl group having up to about seven carbons.

23. A polyhydroxy oligomer according to claim 19 or 21, wherein said anhydride is methyl hexahydrophthalic anhydride.

24. A polyhydroxy oligomer according to claim 22, wherein said monoepoxide $C_2$-$C_{10}$ monomer is selected from the group consisting of alkylene monoepoxides, glycidyl esters, glycidyl ethers, and mixtures thereof.

25. A polyhydroxy oligomer according to claim 19 or 24, wherein said polyhydroxy oligomer is a dihydroxy oligomer and said monoepoxide $C_2$-$C_{10}$ monomer contains no hydroxy functionality.

26. A polyhydroxy oligomer according to claim 25, wherein said alkyl hexahydrophthalic anhydride is methyl hexahydrophthalic anhydride.

27. A polyhydroxy oligomer according to claim 26, wherein said branched diol is 2-ethyl-1,3-hexane diol.

28. A polyhydroxy oligomer according to claim 27, wherein said monoepoxide $C_2$-$C_{10}$ monomer is propylene oxide.

29. A polylhydroxy oligomer according to claim 19, wherein said acid ester is a dicarboxylic acid ester made by combining said diol and said anhydride in the reaction mixture in amounts and under conditions sufficient to result in reaction in a 1:2 molar ratio.

30. A polyhydroxy oligomer according to claim 29, wherein said branched diol is 2-ethyl-1,3-hexane diol.

31. A polyhydroxy oligomer according to claim 30, wherein said anhydride is methyl hexahydrophthalic anhydride.

32. A polyhydroxy oligomer according to claim 31, wherein said monomer is selected from the group consisting of alkylene monoepoxides, glycidyl esters, glycidyl ethers and mixtures thereof.

33. A polyhydroxy oligomer according to claim 32, wherein said monoepoxide monomer contains no hydroxyl functionality.

34. A high solids thermosetting coating composition which contains greater than about 60 percent by weight of nonvolatile solids, and which exclusive of pigments, solvents, and other nonreactive components consists essentially of:
(A) a polyhydroxy oligomer having a number average ($\overline{M}_n$) molecular weight of between about 300-2000 and comprising the reaction product of:
(i) an acid ester made by reacting:
(a) a $C_4$-$C_{10}$ aliphatic branched diol, and
(b) an alkyl hexahydrophthalic anhydride, wherein (a) and (b) are combined in the reaction mixture in amounts and under conditions sufficient to result in reaction in a molar ratio of greater than 1:1 up to 1:2; and
(ii) a monoepoxide $C_2$-$C_{10}$ monomer, wherein said monomer is included in an amount sufficient to provide reaction of about 1.0 epoxide group for each acid group of said acid ester;
(B) an amine-aldehyde crosslinking agent;
(C) 0-50 weight percent based on the total weight of (A), (B), (C) and (D) of a hydroxy functional additive having a number average molecular weight ($\overline{M}_n$) of between about 150-6000; and
(D) up to 15 weight percent based on the total weight of (A), (B), (C) and (D) of a flow control additive, said amine-aldehyde crosslinking agent being included in said composition in an amount sufficient to provide at least about 0.60 equivalents of nitrogen crosslinking functionality for each equivalent of hydroxyl functionality included in said composition either on said polyhydroxy oligomer or as a hydroxyl group of said hydroxy functional additive.

35. A high solids coating composition according to claim 34, wherein the hydroxy groups of said diol are not attached to adjacent carbon atoms.

36. A high solids coating composition according to claim 35, wherein said diol is 2-ethyl-1,3-hexane diol.

37. A high solid coating composition according to claim 34, wherein the alkyl group of said alkyl hexahydropthalic anhydride comprises a lower alkyl group having up to about seven carbons.

38. A high solids coating composition according to claim 36 or 37, wherein said anhydride is methyl hexahydrophthalic anhydride.

39. A high solids coating composition according to claim 37, wherein said monoepoxide $C_2$–$C_{10}$ monomer is selected from the group consisting of alkylene monoepoxides, glycidyl ethers, glycidyl esters, and mixtures thereof.

40. A high solids coating composition according to claims 34 or 39, wherein said polyhydroxy oligomer is a dihydroxy oligomer and said monoepoxide $C_2$–$C_{10}$ monomer contains no hydroxyl functionality.

41. A high solids coating composition according to claim 40, wherein said monoepoxide monomer is propylene oxide.

42. A high solids coating composition according to claim 34, wherein said amine-aldehyded crosslinking agent is selected from the group consisting of condensation products of formaldehyde with melamine, substituted melamine, urea, benzoquanamine and substituted benzoquanamine, and mixtures of said condensation products in an amount sufficient to provide between about 0.75 and about 3.75 equivalents of nitrogen crosslinking functionality for each equivalent of hydroxyl functionality included in said composition either on said polyhydroxy oligomer or as a hydroxyl group of said hydroxy functional additive.

43. A high solids coating composition according to claim 34, wherein said hydroxy functional additive is a polyol selected from the group consisting of (i) hydroxy functional polyester, (ii) hydroxy functional polyethers, (iii) hydroxy functional oligoesters, (iv) monomeric polyols, (v) hydroxy functional copolymers formed from monoethylenically usaturated monomers, one or more of which bears hydroxy functionality and which is included in said copolymer in amounts ranging from about 10 to about 50 weight percent of said copolymer, and (vi) mixtures of (i)–(v).

44. A high solids coating composition according to claim 34, wherein said acid ester is a dicarboxylic acid ester made by combining said diol and said anhydride in the reaction mixture in amounts and under conditions sufficient to result in reaction in a 1:2 molar ratio.

* * * * *